(12) United States Patent  
Bosse et al.

(10) Patent No.: US 8,930,605 B2
(45) Date of Patent: Jan. 6, 2015

(54) SYSTEMS AND METHODS FOR DOCKING PORTABLE ELECTRONIC DEVICES

(75) Inventors: Kevin Bosse, Cedar Park, TX (US);
Scott Semenik, St. Charles, IL (US);
Richard Page, Lake Villa, IL (US);
Richard Teltz, Hamilton (CA); Brian Reeves, Hamilton (CA); Keith McAuliffe, Bellaire, TX (US); Paul Reeves, Oakville (CA)

(73) Assignee: Z124, George Town (KY)

( * ) Notice: Subject to any disclaimer, the term of this patent is extended or adjusted under 35 U.S.C. 154(b) by 144 days.

(21) Appl. No.: 13/251,768

(22) Filed: Oct. 3, 2011

(65) Prior Publication Data

US 2013/0086293 A1 Apr. 4, 2013

Related U.S. Application Data

(60) Provisional application No. 61/389,052, filed on Oct. 1, 2010.

(51) Int. Cl.
*G06F 13/00* (2006.01)
*G06F 1/16* (2006.01)

(52) U.S. Cl.
CPC .................................. *G06F 1/1632* (2013.01)
USPC .......................................... 710/303; 710/304

(58) Field of Classification Search
CPC ... G06F 1/1632; G06F 1/1626; G06F 13/409; G06F 1/1616; G06F 13/385; G06F 13/4081; G06F 1/203; G06F 1/3203; G06F 1/206
USPC ................................ 710/303, 304
See application file for complete search history.

(56) References Cited

U.S. PATENT DOCUMENTS

| 5,191,644 A | 3/1993 | Takeda |
| 5,689,654 A * | 11/1997 | Kikinis et al. ................. 710/303 |
| 5,825,336 A | 10/1998 | Fujita et al. |

(Continued)

FOREIGN PATENT DOCUMENTS

| CN | 100595988 C | * | 3/2010 |
| CN | 201741080 U | * | 2/2011 |

(Continued)

OTHER PUBLICATIONS

U.S. Appl. No. 13/627,132, filed Sep. 26, 2012, Teltz.
U.S. Appl. No. 13/364,152, filed Feb. 1, 2012, Sirpal et al.
U.S. Appl. No. 13/408,828, filed Feb. 29, 2012, Sirpal et al.
U.S. Appl. No. 13/408,839, filed Feb. 29, 2012, Sirpal et al.
Google Image Result Fujitsu Dual Screen Phone, published date unknown, [retrieved Apr. 18, 2011], 1 page. Retrieved from: www.google.com/imgres?imgurl=http://www.computerriver.com/images/dual-screen-phone.jpg.

(Continued)

*Primary Examiner* — Faisal M Zaman
(74) *Attorney, Agent, or Firm* — Sheridan Ross P.C.

(57) ABSTRACT

Systems and methods for docking portable electronic devices. A master device may be docked to a slave device to control the operation of the slave device. The slave device may have a form factor different than that of the master device. For example, the slave device may be a tablet and the master device may be a handheld device such as a smart phone. The slave device may include a retention mechanism to retain the master device in a docked position with respect to the slave device. When in the docked position, the master device may be in operative communication with one or more hardware components of the slave device to control the operation thereof. The slave device may lack the ability to exploit the full functionality of the one or more hardware components of the slave device without communication with the master device.

20 Claims, 13 Drawing Sheets

(56) References Cited

U.S. PATENT DOCUMENTS

| | | | |
|---|---|---|---|
| 5,884,049 A * | 3/1999 | Atkinson | 710/303 |
| 5,991,838 A * | 11/1999 | Swindler et al. | 710/303 |
| 6,008,867 A | 12/1999 | Cooper et al. | |
| 6,185,095 B1 * | 2/2001 | Helot et al. | 361/679.44 |
| 6,226,165 B1 * | 5/2001 | Collins et al. | 361/115 |
| 6,309,230 B2 * | 10/2001 | Helot | 439/131 |
| 6,489,932 B1 * | 12/2002 | Chitturi et al. | 345/30 |
| 6,538,880 B1 * | 3/2003 | Kamijo et al. | 361/679.4 |
| 6,724,618 B1 * | 4/2004 | Jenkins et al. | 361/679.32 |
| 7,474,524 B1 * | 1/2009 | Shaw | 361/679.02 |
| 7,549,007 B1 * | 6/2009 | Smith et al. | 710/303 |
| 7,552,187 B2 | 6/2009 | Fuchs | |
| 7,552,264 B2 * | 6/2009 | Landron et al. | 710/304 |
| 7,627,343 B2 | 12/2009 | Fadell | |
| 7,719,830 B2 | 5/2010 | Howarth | |
| 7,954,068 B2 | 5/2011 | Riggs et al. | |
| 8,254,992 B1 | 8/2012 | Ashenbrenner et al. | |
| 2002/0119800 A1 * | 8/2002 | Jaggers et al. | 455/550 |
| 2002/0140635 A1 | 10/2002 | Saitou et al. | |
| 2003/0017746 A1 * | 1/2003 | Lee | 439/638 |
| 2003/0025678 A1 * | 2/2003 | Lee et al. | 345/173 |
| 2003/0041206 A1 | 2/2003 | Dickie | |
| 2003/0172217 A1 | 9/2003 | Scott et al. | |
| 2004/0004603 A1 * | 1/2004 | Gerstner et al. | 345/169 |
| 2004/0019724 A1 * | 1/2004 | Singleton et al. | 710/303 |
| 2004/0150581 A1 | 8/2004 | Westerinen et al. | |
| 2004/0201621 A1 | 10/2004 | Stevens | |
| 2005/0083642 A1 | 4/2005 | Senpuku et al. | |
| 2005/0111182 A1 | 5/2005 | Lin et al. | |
| 2005/0185364 A1 | 8/2005 | Bell et al. | |
| 2005/0231161 A1 * | 10/2005 | Jones et al. | 320/114 |
| 2006/0007114 A1 | 1/2006 | Shiraishi | |
| 2006/0082518 A1 | 4/2006 | Ram | |
| 2006/0116164 A1 | 6/2006 | Kang | |
| 2006/0164542 A1 | 7/2006 | Kondo | |
| 2006/0164802 A1 * | 7/2006 | Chen | 361/683 |
| 2006/0236014 A1 | 10/2006 | Yin et al. | |
| 2006/0262497 A1 * | 11/2006 | Jahlokov | 361/683 |
| 2007/0120763 A1 | 5/2007 | De Paepe et al. | |
| 2007/0124792 A1 | 5/2007 | Bennett et al. | |
| 2007/0146977 A1 * | 6/2007 | Choi | 361/680 |
| 2007/0198760 A1 | 8/2007 | Han | |
| 2007/0242421 A1 | 10/2007 | Goschin et al. | |
| 2008/0072163 A1 | 3/2008 | Teng et al. | |
| 2008/0100531 A1 | 5/2008 | Yoshinaga et al. | |
| 2008/0100995 A1 * | 5/2008 | Ryder et al. | 361/679 |
| 2008/0164790 A1 * | 7/2008 | Tsang et al. | 312/223.2 |
| 2008/0270665 A1 * | 10/2008 | Senatori et al. | 710/303 |
| 2008/0284907 A1 | 11/2008 | Chiao | |
| 2008/0320197 A1 * | 12/2008 | Kumar | 710/304 |
| 2009/0027344 A1 | 1/2009 | Matsunaga et al. | |
| 2009/0061841 A1 | 3/2009 | Chaudhri et al. | |
| 2009/0178097 A1 | 7/2009 | Kim et al. | |
| 2009/0185045 A1 | 7/2009 | Rosenblatt et al. | |
| 2009/0187677 A1 | 7/2009 | Hunt et al. | |
| 2009/0278806 A1 | 11/2009 | Duarte et al. | |
| 2009/0287832 A1 | 11/2009 | Liang et al. | |
| 2010/0069005 A1 | 3/2010 | Haartsen | |
| 2010/0156595 A1 | 6/2010 | Wong et al. | |
| 2010/0257559 A1 | 10/2010 | Friedlander et al. | |
| 2010/0321275 A1 | 12/2010 | Hinckley et al. | |
| 2010/0323786 A1 | 12/2010 | Smith | |
| 2010/0333041 A1 | 12/2010 | Fabrick, II | |
| 2011/0004827 A1 | 1/2011 | Doerr et al. | |
| 2011/0055407 A1 | 3/2011 | Lydon et al. | |
| 2011/0055676 A1 | 3/2011 | Sun et al. | |
| 2011/0095965 A1 | 4/2011 | Yoneoka et al. | |
| 2011/0191503 A1 | 8/2011 | Kakish | |
| 2011/0210922 A1 | 9/2011 | Griffin | |
| 2011/0290965 A1 * | 12/2011 | Virgin | 248/205.3 |
| 2012/0023463 A1 | 1/2012 | Tseng et al. | |
| 2012/0054401 A1 | 3/2012 | Cheng | |
| 2012/0077442 A1 | 3/2012 | Piazza et al. | |
| 2012/0081267 A1 | 4/2012 | Sirpal et al. | |
| 2012/0081268 A1 | 4/2012 | Sirpal et al. | |
| 2012/0081269 A1 | 4/2012 | de Paz | |
| 2012/0081270 A1 | 4/2012 | Gimpl et al. | |
| 2012/0081271 A1 | 4/2012 | Gimpl et al. | |
| 2012/0081277 A1 | 4/2012 | de Paz | |
| 2012/0081278 A1 | 4/2012 | Freedman | |
| 2012/0081280 A1 | 4/2012 | Schrock et al. | |
| 2012/0081289 A1 | 4/2012 | Sirpal et al. | |
| 2012/0081292 A1 | 4/2012 | Sirpal et al. | |
| 2012/0081293 A1 | 4/2012 | Sirpal et al. | |
| 2012/0081302 A1 | 4/2012 | Gimpl et al. | |
| 2012/0081303 A1 | 4/2012 | Cassar et al. | |
| 2012/0081304 A1 | 4/2012 | Sirpal et al. | |
| 2012/0081305 A1 | 4/2012 | Schrock | |
| 2012/0081306 A1 | 4/2012 | Sirpal et al. | |
| 2012/0081307 A1 | 4/2012 | Sirpal et al. | |
| 2012/0081308 A1 | 4/2012 | Sirpal | |
| 2012/0081309 A1 | 4/2012 | Sirpal et al. | |
| 2012/0081310 A1 | 4/2012 | Schrock | |
| 2012/0081311 A1 | 4/2012 | Sirpal et al. | |
| 2012/0081312 A1 | 4/2012 | Sirpal et al. | |
| 2012/0081313 A1 | 4/2012 | Sirpal et al. | |
| 2012/0081314 A1 | 4/2012 | Sirpal et al. | |
| 2012/0081315 A1 | 4/2012 | Sirpal | |
| 2012/0081316 A1 | 4/2012 | Sirpal et al. | |
| 2012/0081317 A1 | 4/2012 | Sirpal et al. | |
| 2012/0081318 A1 | 4/2012 | Sirpal et al. | |
| 2012/0081319 A1 | 4/2012 | Gimpl et al. | |
| 2012/0081322 A1 | 4/2012 | Sirpal et al. | |
| 2012/0081323 A1 | 4/2012 | Sirpal et al. | |
| 2012/0081397 A1 | 4/2012 | de Paz | |
| 2012/0081398 A1 | 4/2012 | Sirpal et al. | |
| 2012/0081399 A1 | 4/2012 | Sirpal et al. | |
| 2012/0081400 A1 | 4/2012 | Schrock | |
| 2012/0081401 A1 | 4/2012 | Sirpal et al. | |
| 2012/0081403 A1 | 4/2012 | Sirpal et al. | |
| 2012/0081854 A1 | 4/2012 | Sirpal et al. | |
| 2012/0083319 A1 | 4/2012 | Sirpal et al. | |
| 2012/0084673 A1 | 4/2012 | Sirpal et al. | |
| 2012/0084674 A1 | 4/2012 | Visosky | |
| 2012/0084675 A1 | 4/2012 | Sirpal et al. | |
| 2012/0084676 A1 | 4/2012 | de Paz | |
| 2012/0084677 A1 | 4/2012 | Sirpal et al. | |
| 2012/0084678 A1 | 4/2012 | Sirpal et al. | |
| 2012/0084679 A1 | 4/2012 | Sirpal et al. | |
| 2012/0084680 A1 | 4/2012 | Gimpl et al. | |
| 2012/0084681 A1 | 4/2012 | Cassar | |
| 2012/0084682 A1 | 4/2012 | Sirpal et al. | |
| 2012/0084686 A1 | 4/2012 | Sirpal et al. | |
| 2012/0084687 A1 | 4/2012 | Sirpal et al. | |
| 2012/0084690 A1 | 4/2012 | Sirpal et al. | |
| 2012/0084693 A1 | 4/2012 | Sirpal et al. | |
| 2012/0084694 A1 | 4/2012 | Sirpal et al. | |
| 2012/0084697 A1 | 4/2012 | Reeves | |
| 2012/0084698 A1 | 4/2012 | Sirpal et al. | |
| 2012/0084699 A1 | 4/2012 | Sirpal et al. | |
| 2012/0084700 A1 | 4/2012 | Sirpal et al. | |
| 2012/0084701 A1 | 4/2012 | Sirpal et al. | |
| 2012/0084706 A1 | 4/2012 | Sirpal et al. | |
| 2012/0084709 A1 | 4/2012 | Sirpal | |
| 2012/0084710 A1 | 4/2012 | Sirpal et al. | |
| 2012/0084712 A1 | 4/2012 | Gimpl et al. | |
| 2012/0084714 A1 | 4/2012 | Sirpal et al. | |
| 2012/0084715 A1 | 4/2012 | Sirpal et al. | |
| 2012/0084716 A1 | 4/2012 | Sirpal et al. | |
| 2012/0084718 A1 | 4/2012 | Gimpl et al. | |
| 2012/0084719 A1 | 4/2012 | Sirpal et al. | |
| 2012/0084720 A1 | 4/2012 | Sirpal et al. | |
| 2012/0084721 A1 | 4/2012 | Gimpl et al. | |
| 2012/0084722 A1 | 4/2012 | Cassar et al. | |
| 2012/0084723 A1 | 4/2012 | Reeves et al. | |
| 2012/0084724 A1 | 4/2012 | Sirpal et al. | |
| 2012/0084725 A1 | 4/2012 | Sirpal et al. | |
| 2012/0084726 A1 | 4/2012 | Sirpal et al. | |
| 2012/0084727 A1 | 4/2012 | Sirpal et al. | |
| 2012/0084735 A1 | 4/2012 | Sirpal | |
| 2012/0084736 A1 | 4/2012 | Sirpal | |
| 2012/0084737 A1 | 4/2012 | Gimpl et al. | |
| 2012/0084738 A1 | 4/2012 | Sirpal | |
| 2012/0084739 A1 | 4/2012 | Sirpal et al. | |

(56) References Cited

U.S. PATENT DOCUMENTS

| | | | |
|---|---|---|---|
| 2012/0084791 | A1 | 4/2012 | Benedek et al. |
| 2012/0105363 | A1 | 5/2012 | Sirpal et al. |
| 2012/0110486 | A1 | 5/2012 | Sirpal et al. |
| 2012/0110497 | A1 | 5/2012 | Gimpl et al. |
| 2012/0117290 | A1 | 5/2012 | Sirpal et al. |
| 2012/0117495 | A1 | 5/2012 | Sirpal et al. |
| 2012/0124490 | A1 | 5/2012 | Sirpal et al. |
| 2012/0144323 | A1 | 6/2012 | Sirpal et al. |
| 2012/0174028 | A1 | 7/2012 | Sirpal et al. |
| 2012/0210034 | A1 | 8/2012 | Ko |
| 2012/0240056 | A1 | 9/2012 | Webber |
| 2012/0266098 | A1 | 10/2012 | Webber |
| 2013/0021262 | A1 | 1/2013 | Chen |
| 2013/0076598 | A1 | 3/2013 | Sirpal et al. |
| 2013/0078994 | A1 | 3/2013 | Jouin |
| 2013/0078995 | A1 | 3/2013 | Jouin |
| 2013/0079054 | A1 | 3/2013 | Jouin |
| 2013/0198867 | A1 | 8/2013 | Ricci et al. |
| 2013/0201078 | A1 | 8/2013 | Russello |
| 2013/0207598 | A1 | 8/2013 | Teltz et al. |
| 2013/0273970 | A1 | 10/2013 | Selim |
| 2013/0275642 | A1 | 10/2013 | Teltz |
| 2013/0275643 | A1 | 10/2013 | Teltz |
| 2013/0309973 | A1 | 11/2013 | Raveendran et al. |
| 2014/0006669 | A1 * | 1/2014 | Klein et al. .................. 710/303 |

FOREIGN PATENT DOCUMENTS

| | | |
|---|---|---|
| FR | 2816093 | 5/2002 |
| FR | 2902207 A1 * | 12/2007 |
| JP | 2008-206210 | 9/2008 |
| JP | 2010-271713 | 12/2010 |
| JP | 2012-138067 | 7/2012 |
| WO | WO 98/21709 | 5/1998 |
| WO | WO 2005086466 A1 * | 9/2005 |
| WO | WO 2009/006535 | 1/2009 |
| WO | WO 2009/037588 | 3/2009 |

OTHER PUBLICATIONS

Google Image Result for LG Dual Touch Screen Concept Phone by Eugene Kim, published date unknown, [retrieved Apr. 18, 2011], 1 page. Retrieved from: www.google.com/imgres?imgurl=http://fgadgets.com/wp-content/uploads/2010/08/lg-dual-touch-screen-phone-Eugene-Kim-01.jpg.

Google Image Result for Fujitsu Dual Screen Phone, published date unknown, [retrieved Apr. 18, 2011], 1 page. Retrieved from: www.google.com/imgres?imgurl=http://www.gsmdome.com/wp-content/uploads/2010/10/fujitsu-dual-screen-phone_w2cP7_54.jpg.

Google Image Result for Kyocera Echo, published date unknown, [retrieved Apr. 18, 2011], 1 page. Retrieved from: www.google.com/imgres?imgurl=http://www.hardwaresphere.com/wp-content/uploads/2011/02/kyocera-echo-dual-screen-android-phone-for-sprint-network.jpg.

Google Image Result for HTC Triple Viper, published date unknown, [retrieved Apr. 18, 2011], 1 page. Retrieved from:www.google.com/imgres?imgurl=http://vvww.santafemods.com/Forum/AndroidForums/htcTripleViper.png.

Google Image Result for Dual-Screen Phone, [retrieved Apr. 18, 2011], 1 page. Retrieved from: www.google.com/imgres?imgurl=http://www.netshet.org/wp-content/uploads/2011/02/Dual-Scree . . . .

Website entitled, "Kyocera Echo," Kyocera Communications, Inc., 2011, [retrieved on Aug. 27, 2012], 6 pages. Retrieved from: www.echobykyocera.com/.

Website entitled "Lapdock™ for Motorola Atrix," Motorola Mobility, Inc, 2011, [retrieved on Apr. 18, 2011], 1 page. Retrieved from: www.motorola.com/Consumers/US-EN/Consumer-Product-and-Services/Mobile . . . .

Website entitled "Motorola Atrix 4G Laptop Dock Review," phoneArena.com, posted Mar. 2, 2011, [retrieved on Apr. 18, 2011], 6 pages. Retrieved from: www.phonearena.com/reviews/Motorola-Atrix-4G-Laptop-Dock-Review__id2667.

Website entitled, "Sony Tablet," Sony Corporation, 2012, [retrieved on Aug. 27, 2012], 3 pages. Retrieved from: www.store.sony.com/webapp/wcs/stores/servlet/CategoryDisplay?catalog Id=10551 &storeId=10151&langId=-1&categoryId=8198552921644795521.

Burns, C., "Motorola Atrix 4G Laptop Dock Review," Android Community, Feb. 20, 2011, [retrieved on Apr. 18, 2011], 5 pages. Retrieved from: www.androidcommunity.com/motorola-atrix-4g-laptop-dock-review-20110220/.

Catacchio, "This smartphone has two huge screens . . . that rotate," The Next Web, Inc., Oct. 7, 2010, [retrieved on Jul. 21, 2011], 2 pages. Retrieved from: www.thenextweb.com/asia/2010/10/07/this-smartphone-has-two-huge-screens-that-rotate/.

Posted by Harman03, "Kyocera Echo Dual-screen Android Phone," posted 4 weeks from Apr. 18, 2011, [retrieved on Apr. 18, 2011], 3 pages. Retrieved from: www.unp.me/f106/kyocera-echo-dual-screen-android-phone-143800/.

Stein, S., "How does the Motorola Atrix 4G Lapdock compare with a laptop?" Crave—CNET, Feb. 9, 2011 [retrieved on Apr. 18, 2011], 7 pages. Retrieved from: www.news.cnet.com/8301-17938_105-20031251-1.html.

International Search Report and Written Opinion for International (PCT) Patent Application No. PCT/US2011/054609, mailed Oct. 23, 2012 10 pages.

International Search Report and Written Opinion for International (PCT) Patent Application No. PCT/US2011/054643, mailed Apr. 24, 2012 9 pages.

"Bluetooth," Wikipedia, printed Jun. 8, 2012, 11 pages (found at http://en.wikipedia.org/wiki/Bluetooth).

"Cryptography" Wikipedia, published date unknown, 10 pages [retrieved from Internet Archive capture, Nov. 27, 2011 at http://web.archive.org/web/20111127000223/http://en.wikipedia.org/wiki/Cryptography].

"Key (cryptography)" Wikipedia, published date unknown, 3 pages [retrieved from Internet Archive capture, Nov. 26, 2011 at http://web.archive.org/web/20111126235921/http://en.wikipedia.org/wiki/Key_%28cryptography%29].

Layton "How Remote Controls Work," HowStuffWorks, published date unknown, 4 pages [retrieved from Internet Archive Dec. 19, 2011 capture, http//web.archive.org/web/20111219132400/http://electronics.howstuffworks.com/remote-control2.htm/printable].

International Preliminary Report on Patentability for International (PCT) Patent Application No. PCT/US2011/054609, mailed Apr. 11, 2013 7 pages.

International Preliminary Report on Patentability for International (PCT) Patent Application No. PCT/US2011/054643, mailed Apr. 11, 2013 6 pages.

Official Action for U.S. Appl. No. 13/252,012, mailed Jun. 17, 2013 9 pages.

Notice of Allowance for U.S. Appl. No. 13/252,012, mailed Oct. 7, 2013 12 pages.

Official Action for U.S. Appl. No. 13/834,137, mailed Apr. 25, 2014 11 pages.

Official Action for U.S. Appl. No. 13/627,132, mailed Mar. 21, 2014 9 pages.

Notice of Allowance for U.S. Appl. No. 13/252,012, mailed Jan. 6, 2014, 6 pages.

Official Action for U.S. Appl. No. 13/835,189, mailed Jun. 20, 2014 13 pages.

Official Action for U.S. Appl. No. 13/834,137, mailed Aug. 21, 2014 15 pages.

Official Action for U.S. Appl. No. 13/627,132, mailed Aug. 19, 2014 9 pages.

Morrow, "Bluetooth Operation and Use," McGraw-Hill Companies, 2002, pp. 1-34, 189-215.

Official Action for U.S. Appl. No. 13/840,138, mailed Oct. 6, 2014 20 pages.

Official Action for U.S. Appl. No. 13/835,189, mailed Oct. 10, 2014 17 pages.

* cited by examiner

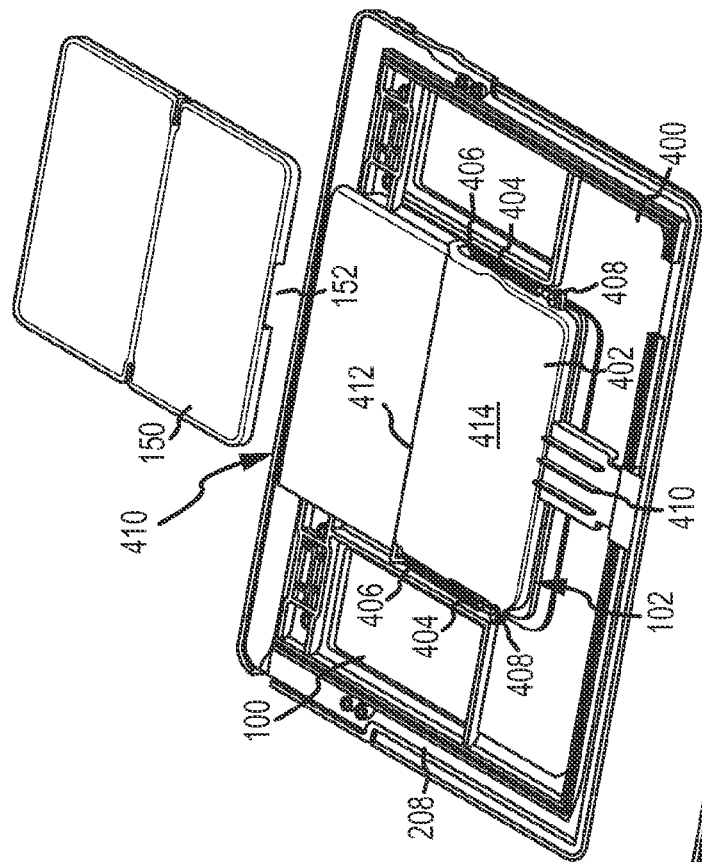
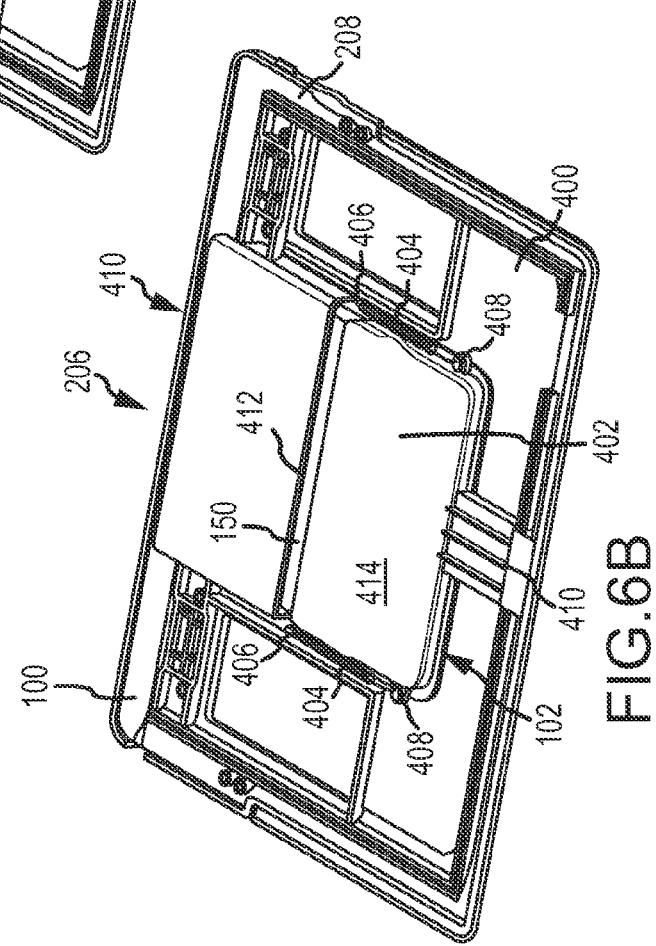

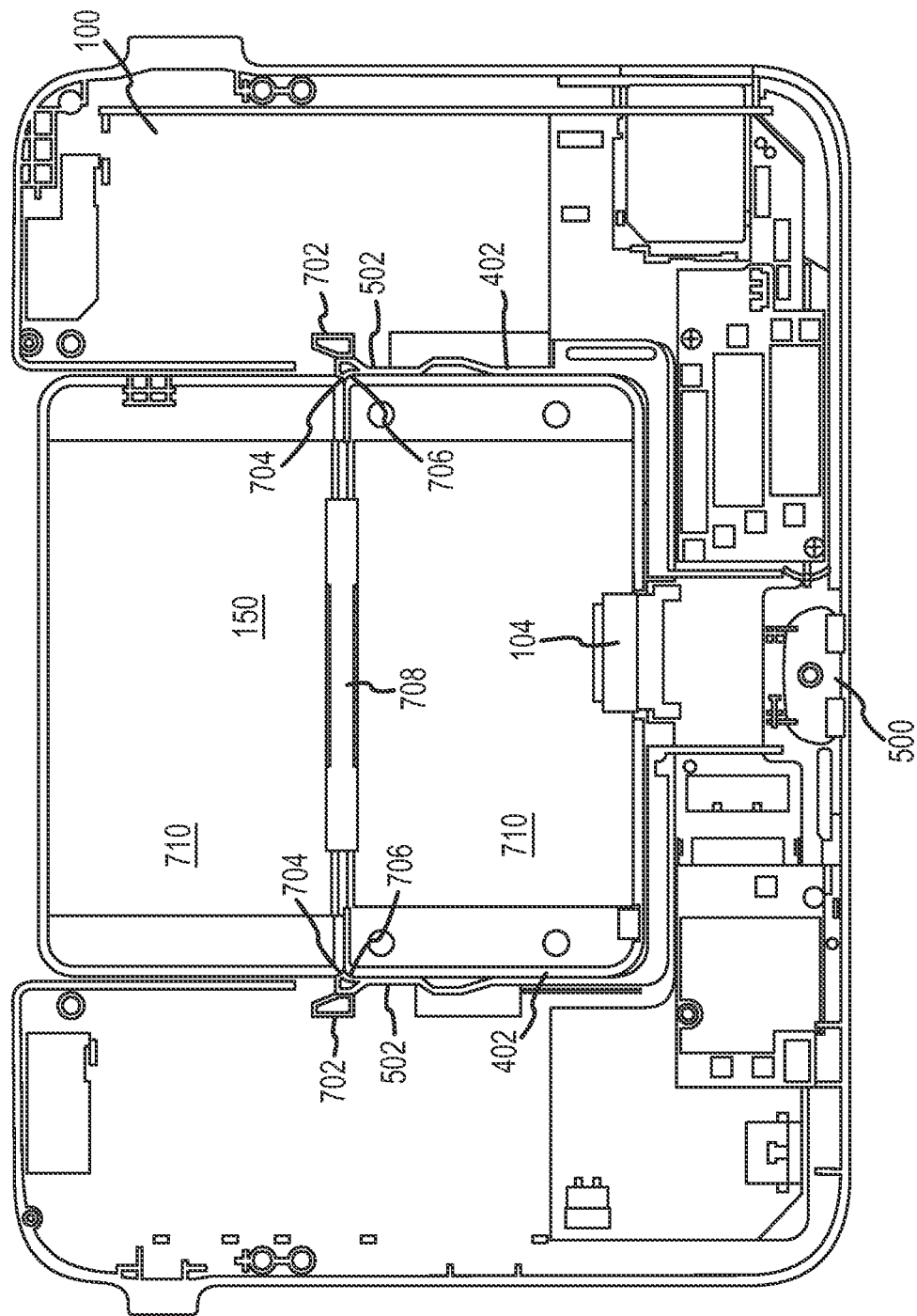

SYSTEMS AND METHODS FOR DOCKING PORTABLE ELECTRONIC DEVICES

CROSS-REFERENCE TO RELATED APPLICATIONS

This application claims the benefit of U.S. Provisional Patent Application No. 61/389,052 filed Oct. 1, 2010 entitled "DOCKING PHONE TABLET", the entirety of which is incorporated by reference herein.

BACKGROUND

The prevalence of portable electronic devices has increased in recent years. Also, the performance capabilities of portable electronic devices have increased in recent years. For example, more powerful processors, improved wireless radios, increased memory capacities, and other increases in performance have been realized in portable electronic devices. Accordingly, the number and variety of tasks that can be performed with portable electronic devices has also increased.

Additionally, portable electronic devices having different form factors have been proposed. For example, a number of tablet devices have been proposed that may present advantages over smaller handheld electronic devices (such as smart phones, personal digital assistants (PDAs), etc.). For instance, tablets often make use of larger displays than handheld electronic devices. In this regard, tablets may present a larger display area that may facilitate added features (e.g., more robust graphical user interfaces may be developed for use with tablet devices). Additionally, because the overall size of tablet devices is often larger than handheld electronic devices, larger, more powerful batteries may be provided that have longer battery life than batteries of handheld electronic devices. As such, tablet devices may be able to operate for longer durations than handheld electronic devices.

However, tablets may also suffer from a number of drawbacks when compared to handheld electronic devices. For example, tablets, while potentially more convenient than many laptop or desktop computers, may not demonstrate the same convenience of handheld electronic devices. Additionally, in many cases, handheld electronic devices may be used as telephones or include wireless radios that enable communication with a cellular network (e.g., including both voice and data network capabilities). While some tablets include some form of wireless radio (e.g., 802.11, Bluetooth, etc.), many do not include wireless radios for communication with a cellular network. Those tablets that do include cellular radios often require an additional arrangement (e.g., an additional contract or a unique SIM card) with a service provider in order to utilize the cellular network with the tablet device.

Users often employ both tablet and handheld devices. For example, which device a user employs may depend upon the specific context of use. In this regard, a user may desire continuity of data across the devices employed. However, the ability to provide continuity of data across the multiple devices may be burdensome. For example, an individual may begin a task utilizing a handheld electronic device and wish to continue the task utilizing another device (e.g., a tablet device). However, the ability to transition performance of the task from the handheld electronic device to the tablet device may prove difficult. Some proposed solutions include, for example, cloud computing, server-based solutions, and other means of synching data across multiple devices. However, these proposed solutions often require costly subscriptions or complicated hardware setups to accomplish such services. Furthermore, the continuity of the task being performed may be interrupted (e.g., requiring the progress of the task to be saved and reopened on the other device) as opposed to "on the fly" changes of devices. As such, these solutions often present a large cost burden, may introduce security concerns regarding sensitive data, and may interrupt the continuity of tasks performed using the devices.

SUMMARY

A first aspect includes a slave device for supportively engaging a master device. The slave device includes a retention mechanism operable to retain a master device in a docked position with respect to the slave device. When in the docked position at least a portion of the master device is contained within the envelope of the slave device. The slave device also includes one or more hardware components integrally provided with the slave device. The slave device further includes a connector disposed relative to the retention mechanism. The connector is operable to establish a communication interface between the master device and the one or more hardware components for communication between the master device and the one or more hardware components when the master device is in the docked position. As such, the master device is operable to control the one or more hardware components when the master device is in the docked position, and the one or more hardware components require communication with the master device to realize full functionality.

A second aspect includes a system for docking portable electronic devices. The system includes a master device that includes a processor. The master device has a communication port in operative communication with the processor. The system also includes a slave device. The slave device includes a retention mechanism operable to retain the master device in a docked position with respect to the slave device. When in the docked position at least a portion of the master device is contained within the envelope of the slave device. The slave device also includes one or more hardware components integrally provided with the slave device. The slave device further includes a connector disposed relative to the retention mechanism and in operative communication with the one or more hardware components. The connector is operable to establish a communication interface with the communication port of the master device for communication between the processor and the one or more hardware components when the master device is in the docked position. The processor of the master device is operable to control the one or more hardware components when the master device is in the docked position, and the one or more hardware components require communication with the processor to realize full functionality.

A number of feature refinements and additional features are applicable to the first and second aspects. These feature refinements and additional features may be used individually or in any combination. As such, each of the following features that will be discussed may be, but are not required to be, used with any other feature or combination of features of the aspects presented herein.

In one embodiment, the slave device may be a tablet device, and the master device may be a handheld device. Additionally, the retention mechanism may be operable to selectively release the master device from the docked position. The retention mechanism may include at least one engagement member that is interlockingly engageable with a correspondingly shaped engagement feature of the master device when the master device is in the docked position to securably retain the master device in the docked position. The at least one engagement member may be displaceable from interlocking engagement with the engagement feature for selectively releasing the master device. In one embodiment, the engagement feature of the master device comprises a contour defined at least partially by the housing of the master device.

In another embodiment, the retention mechanism may include frictional engagement of the master device by the slave device. In this regard, the retention mechanism may include a frictional engagement member contactable with the master device when in the docked position to retain the master device in the docked position.

At least one input device of the master device may be exposed at an exterior of the slave device when the master device is in the docked position. In one embodiment, the one or more hardware components may include a touch screen display disposed on a first side of the slave device. Accordingly, when the master device is in the docked position, display data provided to, and input data received from, the touch screen display may be exchangeable between the slave device and the master device. The slave device may not include a wireless modem. Furthermore, the slave device may not include a processor operable to exploit full functionality of the one or more hardware components.

Additionally, in one embodiment, the communication interface established between the connector and the communication port includes a power interface for providing power between the master device and slave device. In this regard, power may be supplied from the master device to the slave device or from the slave device to the master device via the power interface.

A third aspect includes a method for docking portable electronic devices. The method includes positioning a master device in a docked position with respect to a slave device. Additionally, the method includes retaining, using a retention mechanism, the master device with respect to the slave device. The method also includes connecting, upon the positioning, a communication port of the master device with a connector of the slave device disposed with respect to the retention mechanism and communicating data between the slave device and the master device. The method further includes controlling with the master device, one or more hardware components of the slave device.

A number of feature refinements and additional features are applicable to the third aspect. These feature refinements and additional features may be used individually or in any combination. As such, each of the following features that will be discussed may be, but are not required to be, used with any other feature or combination of features of the aspects presented herein.

For example, in one embodiment, the connecting may occur during operation of the master device. As such, the communicating and controlling may occur without disruption of operation of the master device.

BRIEF DESCRIPTION OF THE DRAWINGS

FIGS. 6A and 6B illustrate a cut-away perspective view of the embodiment of FIG. 2 with the handheld device in an undocked and docked position, respectively.

FIG. 9 illustrates another cross-sectional view of the embodiment of the retention mechanism of FIG. 7.

DETAILED DESCRIPTION

Figure 1:
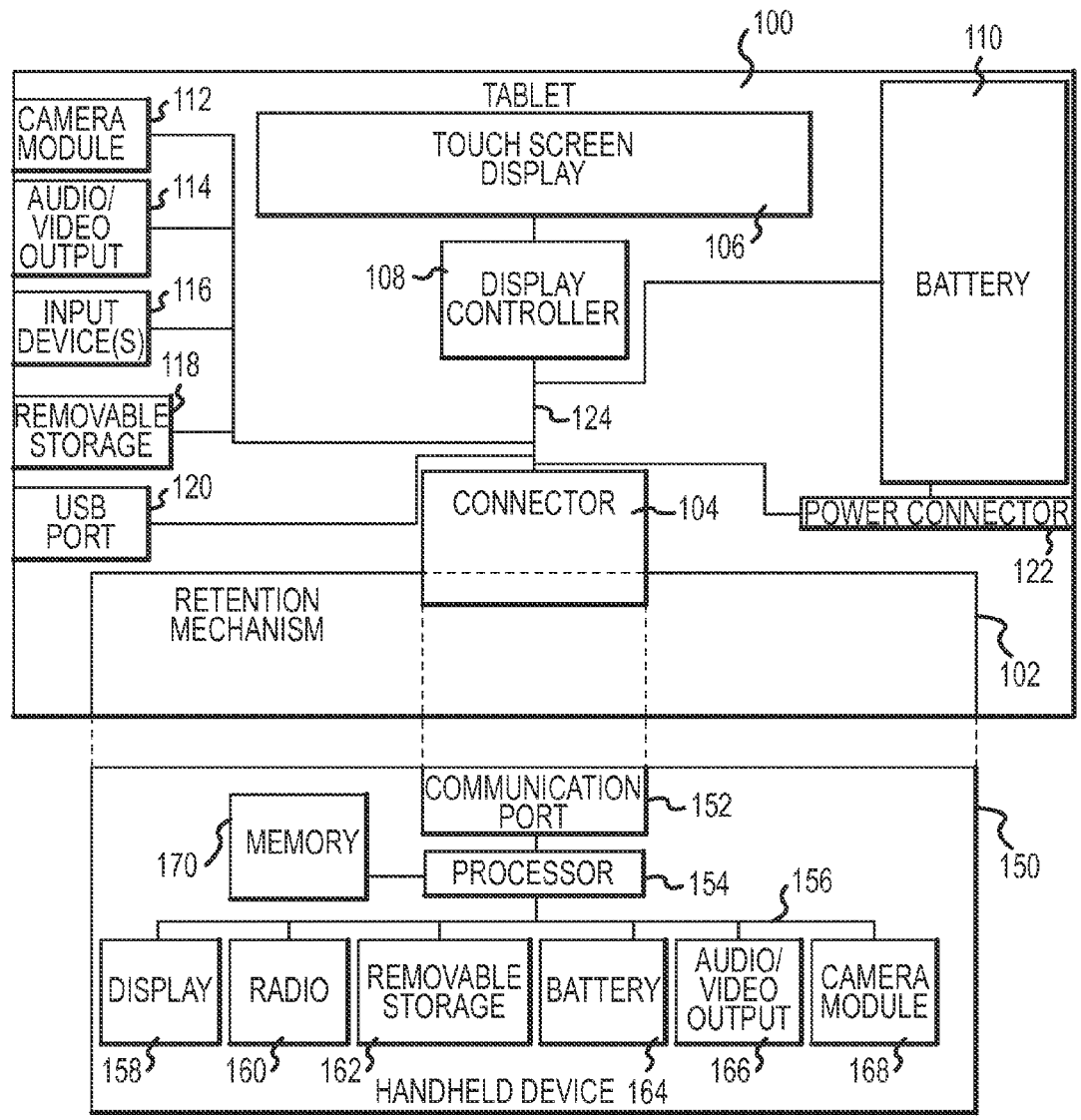
FIG. 1 illustrates a schematic view of an embodiment of a system for docking portable electronic devices.

The following description is not intended to limit the invention to the form disclosed herein. Consequently, variations and modifications commensurate with the following teachings, skill and knowledge of the relevant art, are within the scope of the present invention. The embodiments described herein are further intended to explain modes known of practicing the invention and to enable others skilled in the art to utilize the invention in such, or other embodiments and with various modifications required by the particular applications(s) or use(s) of the present invention.

The following description relates, generally, to systems and methods of docking portable electronic devices. As described herein, a device may be referred to as a "slave device" or "master device". It is intended that a master device is operative for controlling at least some functionality of the slave device when docked therewith. The docking of the master and slave devices may allow the resources (e.g., processor(s), wireless radio(s), cellular radio(s), memory, etc.) of the master device to provide functionality to components of the slave device (e.g., input devices, display devices, audio and/or video devices, etc.). As such, a relatively simple and affordable slave device may be provided that lacks the resources of the master device. The slave device may take a form different than the form of the master device to provide functional versatility associated with a form other than that of the master device. Because the master device's resources provide the functionality to the slave device's components, the transition between using the master device and slave device may be seamless or "on the fly" and allow for all functionality and data resources of the master device to be utilized with the slave device without the need of complex and expensive synching capabilities such as cloud computing, server access, or time consuming physically synching operations.

A slave device may be provided that includes a retention mechanism for retaining a master device in a docked position with respect to the slave device. For example, the slave device may be a tablet device and the master device may be a handheld device (e.g., a smart phone). In this regard, a connector provided on the tablet may interface with a communication port of the handheld device when the handheld device is docked with the tablet. The connector may provide a communication interface between the handheld device and the tablet. Additionally, the connector may establish an interface for providing power between the tablet and the handheld device. The tablet may include hardware components that are integrated into the tablet device that may be controlled by the handheld device when the handheld device is in the docked position. For example, a touch screen display provided on the tablet device may display information from the handheld device and the handheld device may receive inputs from the touch screen display. Accordingly, as will be discussed in greater detail below, the advantages of both a tablet and handheld device may be realized.

FIG. 1 includes a schematic view of a slave device in the form of a tablet 100 and a master device in the form of a handheld device 150. It will be understood that these particular forms of master and slave devices are for illustrative purposes only and other forms of slave devices and master devices may be provided without limitation. For example, other forms of devices such as devices in the form of game pads, laptop computers, desktop computers, or work station terminals may be employed as either a slave or a master device without limitation.

The tablet device 150 may include a retention mechanism 102. The retention mechanism 102 may correspond to the handheld device 150 such that the handheld device 150 is retainably engaged by the retention mechanism 102 of the tablet 100. As will be discussed in greater detail below, the master device 150 may be retained by the retention mechanism 102 such that at least a portion of the master device 150 is contained within the envelope of the slave device 100. When retainably engaged by the retention mechanism, the handheld device 150 may be in a docked position with respect to the tablet device 100.

The tablet 100 may also include a connector 104. As shown in FIG. 1, the connector 104 may be disposed relative to the retention mechanism 102 such that when the handheld device 150 is engaged with the retention mechanism 102, the connector 152 may interface with a communication port 152 of the handheld device 150. In this regard, the connector 104 may be exposed or may extend into a space provided on the tablet 100 into which the handheld device 150 is received when in the docked position.

The handheld device 150 may include a processor 154 in operative communication with the communication port 152. The processor 154 may be in further operative communication with various components of the handheld device 150. As such, the processor 154 may be operated to control operation of the various components of the handheld device 150. For example, the processor 154 may be in operative communication with a memory 170. The memory 170 may store executable code that is executable by the processor 154 to control the operation of the handheld device 150. For example, the memory 170 may contain code corresponding to an operating system executable by the processor 154 to control the handheld device 150.

The handheld device 150 may further include various other components. In one embodiment, the handheld device 150 may be a smart phone device. In this regard, the handheld device 150 may include components that provide functionality associated with a smart phone. For instance, as shown in FIG. 1, the handheld device 150 may include a display 158 (e.g., a touch screen display device including input and display capabilities). The handheld device 150 may also include one or more wireless radios 160. For example, the one or more wireless radios may include a Wi-Fi radio employing, for instance, an IEEE 802.11 standard; a cellular radio employing, for instance, GSM, CDMA, LTE, or WiMAX; a Bluetooth radio; or other appropriate wireless radio. The handheld device 150 may also include removable storage 162 such as, for example, a Secure Digital (SD) card slot or the like. Furthermore, the handheld device 150 may include, for example, a battery 164, audio and/or video output 166, and a camera module 168. Other various components may be provided without limitation (e.g., an accelerometer, dedicated hardware input devices, contextual hardware input devices, antennas, etc.). The various components of the handheld device 150 may be in operative communication with the processor 154 by way of a communication bus 156.

The connector 104 of the tablet 100 may also be in operative communication with various components of the tablet 100. For example, the tablet 100 may have components that are redundant with those provided on the handheld device (e.g., a camera module 112, audio and/or video outputs 114, removable storage 118, a touch screen display 106, a battery 110) or may have unique components not shared by the handheld device (e.g., a USB port 120, etc.). Additionally, the tablet 100 may include a power connector 122 that may be operative to charge the battery 110 of the tablet or the battery 164 of the handheld device 150 when docked with the tablet 100.

When the handheld device 150 is provided in the docked position, the interface of the communication port 152 and the connector 104 may establish operative communication between the processor 154 and a communications bus 124 provided in the tablet 100. The various components of the tablet 100 may also be in operative communication with the communication bus 124 such that the processor 154 is in operative communication with the various components of the tablet 100 when in the docked position. The communication between the processor 154 and the various components of the tablet 100 may allow for the processor 154 to control the operation of the various components of the tablet 100.

The tablet 100 may be considered a "dumb" device. That is, the tablet 100 may lack the resources to exploit the full functionality of the components of the tablet 100. Of note, the tablet 100 may lack a processor operative to provide full functionality of the various components of the tablet 100. Furthermore, the tablet 100 may lack a radio. In this regard, the tablet 100 may rely on the processor 154 and radio 160 of the handheld device 150 in order to provide full functionality of the components of the tablet 100. For instance, the tablet 100 may require communication with the master device 150 for sufficient processing power to exploit the components of the tablet 100 or to facilitate wireless communication. However, the tablet 100 may provide some rudimentary functionality without the assistance of the master device 150. For example, the touch screen display 106 may be in communication with a display controller 108 that allows the touch screen display 106 to be used for simple tasks (e.g., displaying tablet 100 status information including battery levels, whether a master device 150 is docked, etc.). However, the functionality of the display controller 108 may be limited to certain predefined functionality.

Additionally, the interface defined between the connector 104 and the communications port 152 may include a power interface. As such, power may be supplied from the tablet (e.g., from the battery 110 or power connector 122) to the handheld device 150. Furthermore, power may pass from the handheld device 150 (e.g., the battery 164) to the tablet 100. Thus, the power interface may be established to provide power from the tablet to the handheld device or from the handheld device to the tablet.

Figure 2:
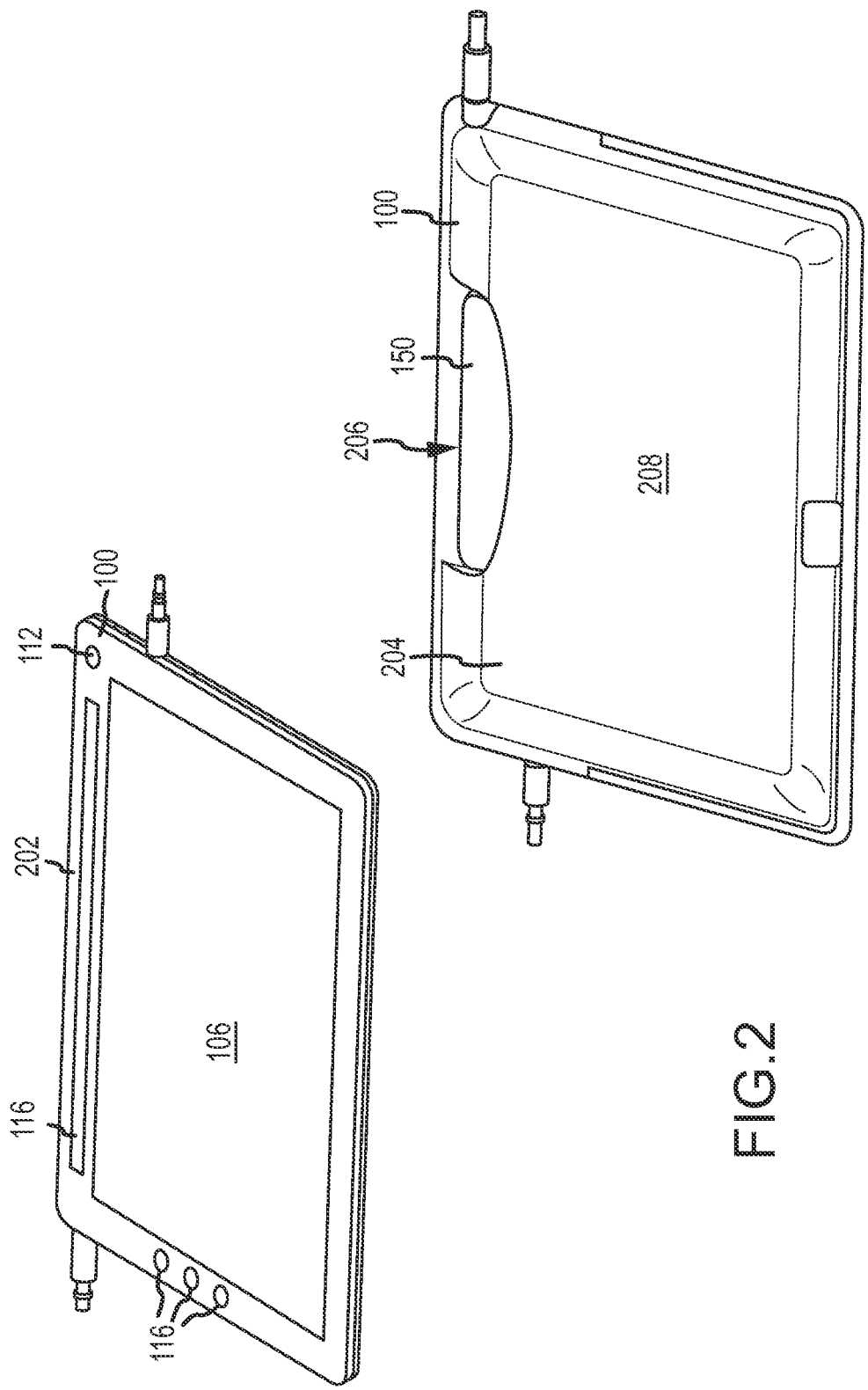
FIG. 2 illustrates a front and back perspective view of an embodiment of a system for docking portable electronic devices including a tablet and handheld device.

With additional reference to FIG. 2, one embodiment of a tablet 100 with a handset 150 provided in a docked position with respect to the tablet 100 is shown. FIG. 2 includes front and back perspective views of the tablet 100. As can be appreciated from FIG. 2, the tablet 100 may include a front side 202 and a back side 204. The front side 202 may include the touch screen display 106. Furthermore, the front side 202 may include a number of input devices 116. For example, a number of buttons or touch sensitive areas may be provided with which a user may interact. The camera module 112 referenced above may be disposed on the front side 202 of the tablet 100. While not shown, additional camera modules may be provided (e.g., a rear facing camera module on the back side 204 of the tablet 100).

The back side 204 may include an aperture 206 through which the handheld device 150 may be disposed. The aperture 206 may extend from an exterior of the tablet 100 to an interior of the tablet 100 as will be discussed in greater detail below. A retention mechanism 102 (not shown in FIG. 2) may be provided to retainably engage the handheld device 150 such that the handheld device 150 is retained in the aperture 206. In this regard, a portion of the handheld device 150 may be covered by a back panel 208 of the tablet 100 when the handheld device 150 is in the docked position. That is, a portion of the handheld device 150 may be contained within the envelope of the tablet 100. In one embodiment, substantially all of the handheld device 150 may be contained within the envelope of the tablet 100. The envelope of the tablet 100 may correspond with the greatest exterior dimension of the tablet. Accordingly, "contained within the envelope of the tablet" may mean that the handheld device 100 does not extend the overall exterior dimensions of the tablet 100.

Figure 3:
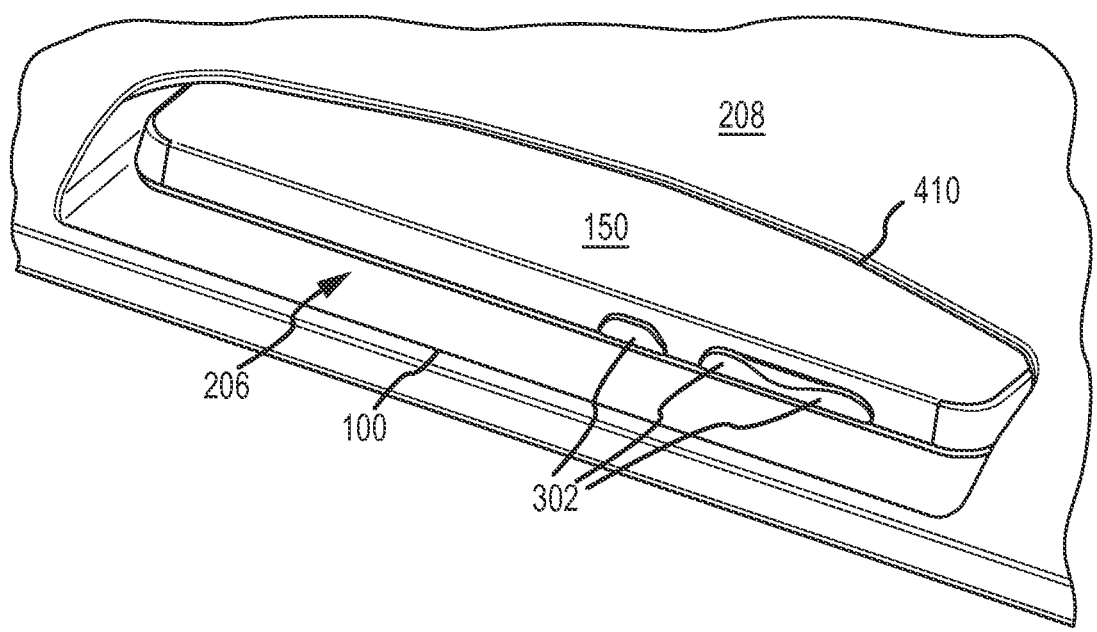
FIG. 3 illustrates a detailed view of the embodiment of FIG. 2 showing the handheld device in a docked position.

FIG. 3 depicts a detailed view of the handheld device 150 in a docked position with respect to the tablet 100. The back panel 208 may be contoured to accommodate receipt of the handheld device 150 into the aperture 206. A portion of the handheld device 150 may still be accessible from an exterior of the tablet 100. For example, as shown in FIG. 3, physical input devices 302 (e.g., buttons such as volume, mute, or power buttons) of the handheld device 150 may be accessible from the exterior of the tablet 100. In this regard, the physical input devices 302 may be used when the handheld device 150 is in the docked position. Accordingly, the need to provide redundant physical input devices 302 on the tablet 100 may be eliminated.

Figure 4:
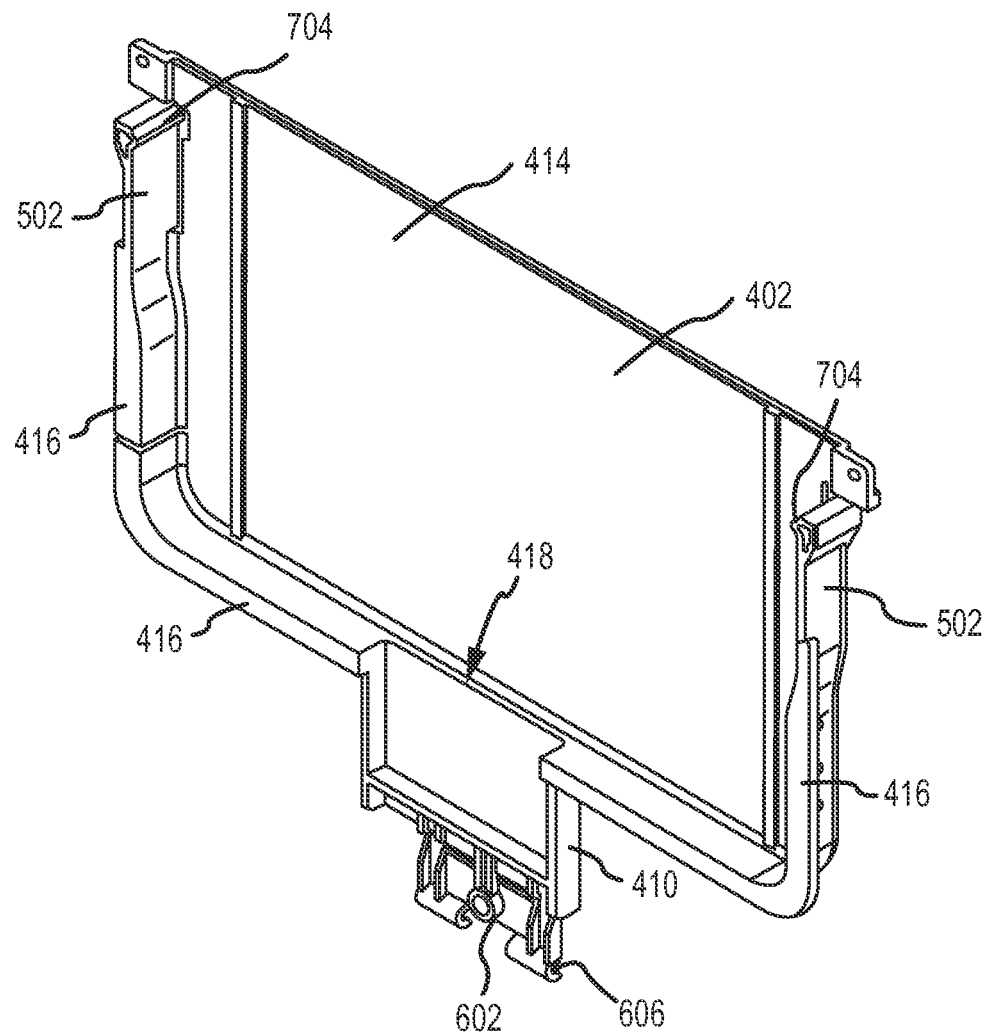
FIG. 4 illustrates a perspective view of an embodiment of a sled for receiving a handheld device.

In one embodiment, the retention mechanism 102 includes a sled 402 as shown in FIG. 4. With additional reference to FIGS. 6A and 6B, the sled 402 may be positioned relative to an outlet 412 of the aperture 206 extending through the back panel 208. In this regard, the aperture 206 extends through the back panel 208 such that the handheld device 150 may be passed through an inlet 410 (shown best in FIG. 3) and may be received by the sled 402 after passing through the outlet 412. As can be appreciated from FIG. 4, the sled 402 is generally open on one side thereof. A backing plate 412 and a sidewall 416 may be contoured to receive the handheld device 150. The sled 402 may be disposed with respect to the back panel 208 as shown in FIGS. 6A and 6B, such that the backing plate 412, sidewall 416, and back panel 208 generally define a pocket for receiving the handheld device 150.

Figure 5:
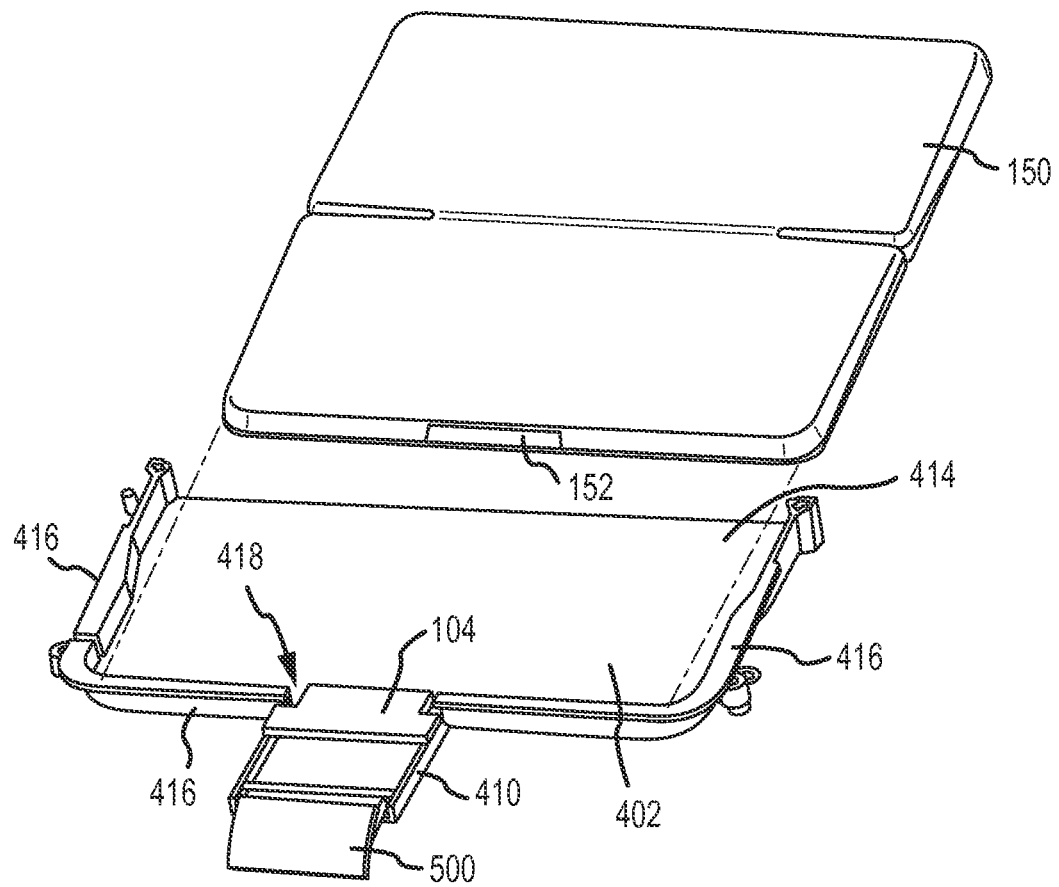
FIG. 5 illustrates the embodiment of the sled according to FIG. 4 in position with respect to a handheld device.

With additional reference to FIG. 5, the sled 402 may also include a tab 410 extending therefrom that supports a latch 500. The operation of the latch 500 will be described in greater detail below with regard to FIGS. 8A and 8B. FIG. 5 shows the handheld device 150 as in position relative to the sled 402. The sled 402 may include a cutout 418 in the sidewall 416 to accommodate a connector 104 as will be further described with respect to FIGS. 6A, 6B, and 7.

Figure 7:
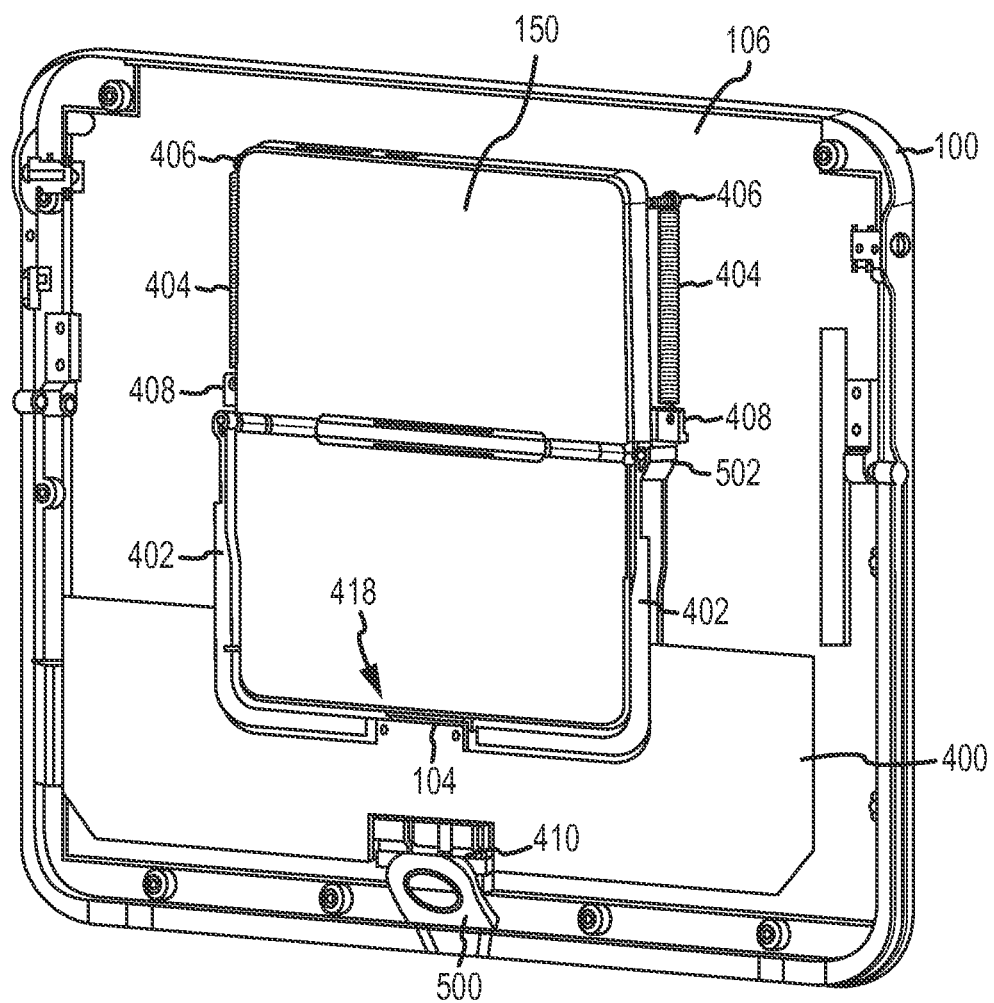
FIG. 7 illustrates an embodiment of a retention mechanism.

FIG. 6A shows one embodiment of a handheld device 150 in an undocked position with respect to an embodiment of a tablet 100 and FIG. 6B shows the handheld device 150 in a docked position with respect to the tablet 100. In FIGS. 6A and 6B, the back panel 208 of the tablet 100 is shown and the front side 204 (e.g., the display 106, bezel, etc.) has been removed for clarity. A printed circuit board (PCB) 400 is visible in FIGS. 6A and 6B. The PCB 400 may include the connector 104 that is operable to interface with the communication port 152 of the handheld device 150. The connector 104 is obstructed from view in FIGS. 6A and 6B by the tab 410. However, the connector 104 is shown passing through the cutout 418 of the sidewall 416 of the sled 402 in FIG. 7, which depicts a view taken from an opposite side of the tablet 100 from that shown in FIGS. 6A and 6B. In FIG. 7, the back panel 208 has been removed for clarity. The PCB 400 may also include electronics components to support the functionality of the tablet 100 as described above. FIG. 7

In one embodiment of the retention mechanism 102, the handheld device 150 may be disposed through the aperture 206 in the back panel 208 and received by a sled 402. As shown in FIG. 6A, the sled 402 may be in an undocked position such that it abuts the outlet 412 of the aperture 206. The sled 402 may also be moveable with respect to the back panel 208. In this regard, springs 404 may be attached at a first end 406 to the back panel 208 and at a second end 408 to the sled 208. Note that different potential embodiments of spring mounting locations are shown in FIGS. 6A-6B and FIG. 7. In any regard, the sled 402 may be biased to the undocked position shown in FIG. 6A.

When the handheld device 150 is disposed through the aperture 206, the handheld device 150 may come into contact with the sled 402 once it exits the outlet 412. The handheld device 150 may continue to be advanced such that the sled 402 is displaced against the biasing force exerted by the springs 404 to a docked position as shown in FIG. 4B. As can be appreciated from FIG. 4B, the sled 402 has been displaced away from the outlet 412 of the aperture 206 so that the sled no longer abuts the outlet 412 when in the docked position. Furthermore, it can be appreciated from FIGS. 4A and 4B that the tab 410 is displaced with respect to the edge of the back cover 208. The movement of the sled 402 from the undocked position to the docked position may allow for advancement of the handheld device 150 with respect to the connector 104 such that a communication port 152 of the handheld device 150 engages the connector 104 to establish operative communication between the handheld device 150 and the connector 104. As the sled 402 is moved with respect to the PCB 400, the connector 104 may project through the cutout 418 such that the communication port 152 of the handheld device 150 is engaged by the connector 104.

Also, as the sled 402 is advanced, the tab 410 having the latch 500 disposed thereon may be advanced with the sled 402. The latch 500 may engage the back panel 208 to retain the sled 402 and handheld device 150 in a docked position such that the communication port 152 of the handheld device 150 is engaged with the connector 104.

The latch 500 may be selectively disengaged to release the handheld device 150 from the tablet 100. When disengaged, the springs 404 may act on the sled 402 to retract the sled 402 from the docked position shown in FIG. 6B to the undocked position shown in FIG. 6A. In this regard, the handheld device 150 may undergo a corresponding retraction movement such that the communication port 152 is disengaged from the connector 104. Also, the handheld device 150 may be expelled from the aperture 206 a sufficient amount such that a user may manipulate the handheld device 150 to fully remove the handheld device 150 from the aperture 206.

Figure 8A:
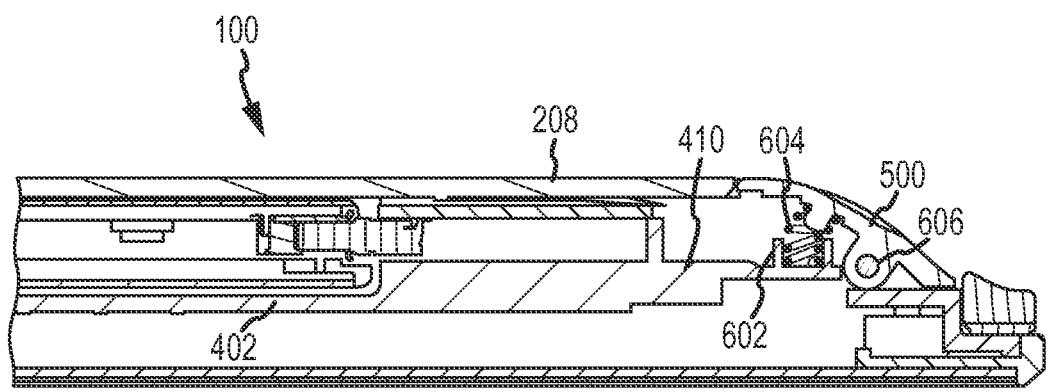
FIGS. 8A and 8B illustrate a cross-sectional view of the embodiment of the retention mechanism of FIG. 7 in a docked and undocked position, respectively.
Figure 8B:
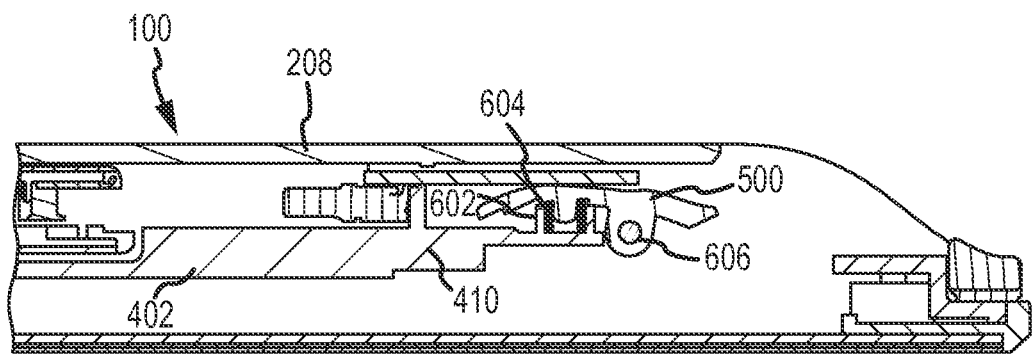

FIG. 8A shows a cross-sectional view of the tablet 100 adjacent to where the latch 500 engages the back panel 208 to retain the sled 402 in the docked position. The tab 410 includes a spring cup 602 (also shown in FIG. 4) that maintains a release spring 604 in position with respect to the tab 410. The latch 500 may be able to pivot about a pivot 606. The release spring 604 acts on the latch 500 to bias the latch 500 into an engaged position as shown in FIG. 8A. When the user desires the handheld device 150 to be released, the user may depress the latch 500 to overcome the biasing force exerted by the release spring 604 as shown in FIG. 8B. In this regard, the latch 500 may disengage the back panel 208 such that the latch 500 slides with respect to back panel 208. This may allow the sled 402, tab 410, and latch 500 to retract by way of the biasing force exerted on the sled 402 by the springs 404 as shown in FIG. 8B.

Returning to FIG. 4, the sled 402 may also include engagement members 502 to physically engage the handheld device 150 to assist in retention of the handheld device 150 in the docked position. Absent the engagement members 502, the only retention of the handheld device 150 in the docked position may be the engagement of the connector 104 with the communication port 152. That is, while the sled 402 may be held in the docked position by the latch 500, the handheld device 150 may still be free to slide out of the aperture 206 if the friction force exerted on the handheld device 150 at the interface of the communication port 152 and connector 104 is overcome. The engagement members 502 may further engage the handheld device 150 to prevent the handheld device 150 from being displaced from the docked position.

With additional reference to FIG. 9, which depicts the sled 402 retainably engaging the handheld device 150, the engagement members 502 may extend from the sled 402. The engagement members 502 may be cantilevered such that the engagement members 502 may be deflectable along the length of the engagement members 502 to move toward and away from the handheld device 150. Ramps 702 may be provided (e.g., molded into the back cover 208) such that when the sled 402 is advanced from the undocked position to the docked position, the engagement members 502 contact the ramps 702. This may result in the engagement members 502 being deflected toward the handheld device 150 upon advancement of the sled 402 toward the PCB 400 and connector 410. The engagement members 502 may include projections 704 that are shaped to interlock with corresponding contours 706 of the handheld device 150. The contours 706 of the handheld device may be defined in the hosing of the handheld device. For example, the handheld device 150 may be a hinged device. In this regard, a hinge 708 may be provided between panels 710 of the handheld device 150. The interface of the panels 710 adjacent to the hinge 708 may define the contours 706. As such, when the engagement members 502 are advanced toward the handheld device 150 by the interaction of the engagement members 702 with the ramps 702 as the sled 402 is advanced into the docked position, the projections 704 may interlock with the contours 706 of the handheld device 150. In this regard, the handheld device 150 may be securely retained in the docked position.

Figure 10:
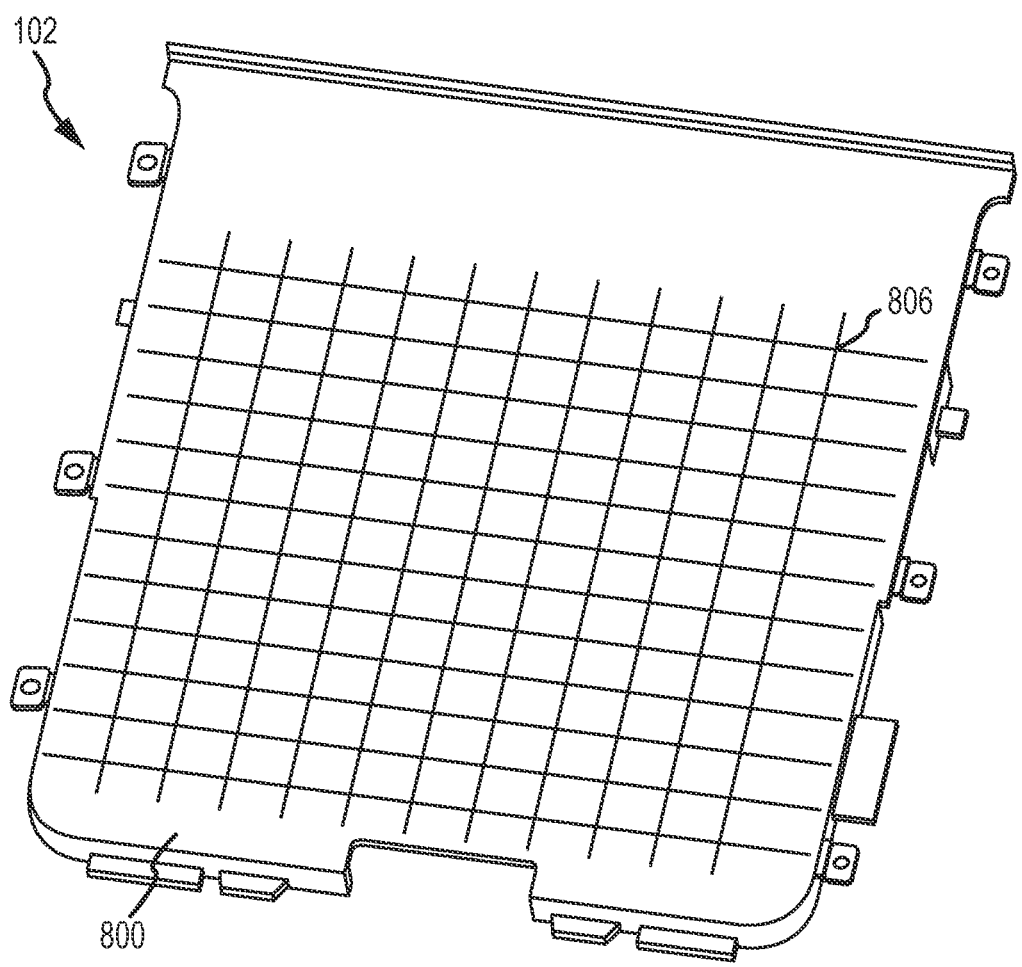
FIGS. 10 and 11 illustrate another embodiment of a retention mechanism.
Figure 11:
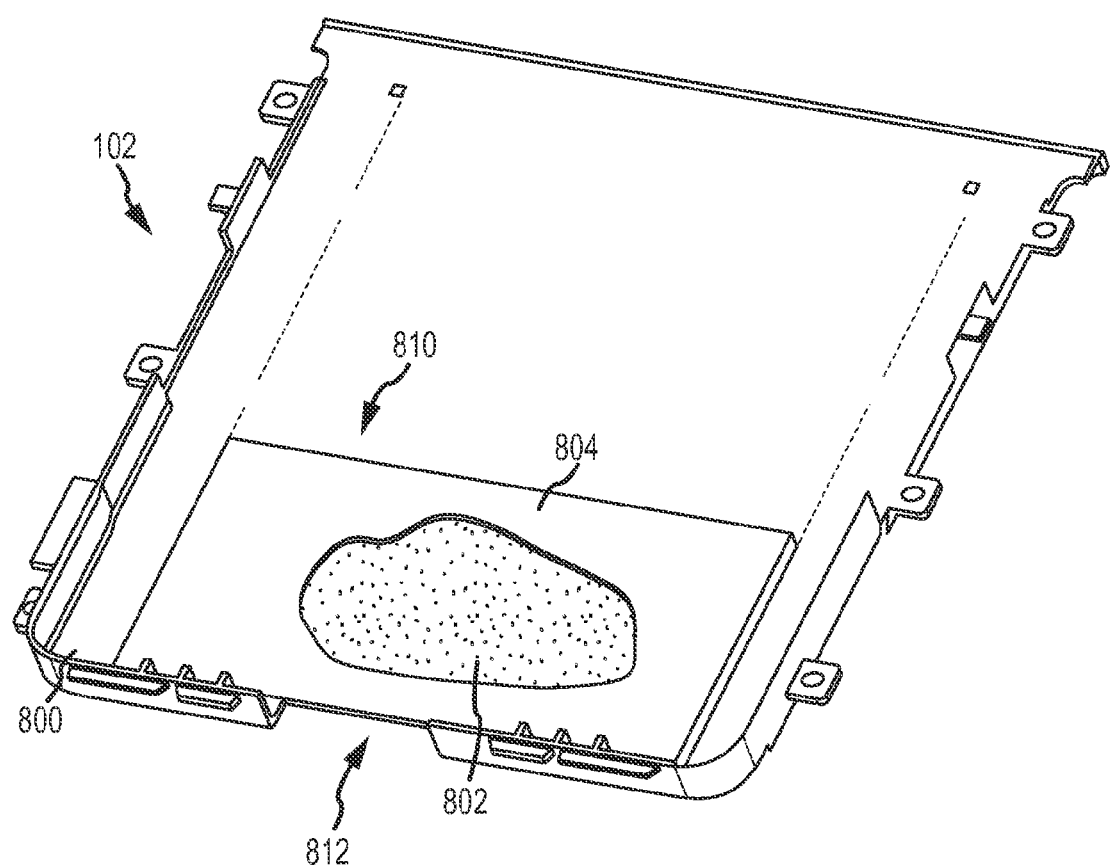

Another embodiment of a retention mechanism 102 is shown in FIGS. 10 and 11. In FIGS. 10 and 11 a tray 800 is shown. The tray 800 may correspond in shape to the handheld device 150. The tray 800 may be provided in the tablet 100 in place of the sled 402 and associated components described above (e.g., the springs 404, etc.). The tray 800, unlike the sled 402, may be stationary with respect to the back panel 208. The tray 800 and back panel 208 may still define a pocket in which the handheld device 150 is received when disposed through the aperture 206. The tray 800 may include a frictional engagement member 810 that frictionally engages the handheld device 150 when advanced into the tray 800. For example, the frictional engagement member 810 may include a resilient material 802 (e.g., a sponge-like material) that is provided in the tray 800 adjacent to a cutout 812 for receiving the connector 104. The frictional engagement member 810 may also include a covering 804 that is provided on the resilient material 802. The covering 804 may be provided to assist in control over the frictional engagement of the handheld device 150. For example, the covering 804 may be a Mylar® polyester film. As can be appreciated, the tray 800, like the sled 402 described above, may be disposed relative to a surface in the tablet 100 so as to define a space for receiving the handheld device 150. Also, as shown in FIG. 10, the tray 800 may include a heat dissipation member 806. For example, the heat dissipation member 806 may be score lines provided in the tray 800 or portions of the heat dissipation member 806 (e.g., alternating squares in the grid shown) may be removed to allow for heat flow therethrough.

In this embodiment of the retention member 102, as the handheld device 150 is advanced into the tray 800 toward the cutout 812, the handheld device 150 may come into contact with the frictional engagement member 810. The resilient material 802 may be deflected to allow the handheld device 150 to continue to be advanced such that the communications port of the handheld device 150 engages a connector 104 disposed in the cutout 812 as previously described. The resilient material 802 may frictionally engage the handheld device 150 adjacent to the connector 104. In this regard, the handheld device 150 may be frictionally retained in the docked position. Accordingly, when a user desires to remove the handheld device 150 from the tablet, the user may grasp the handheld device 150 and apply sufficient force to overcome the frictional engagement of the handheld device 150 to retract the handheld device 150 from the tray 800.

Figure 12:
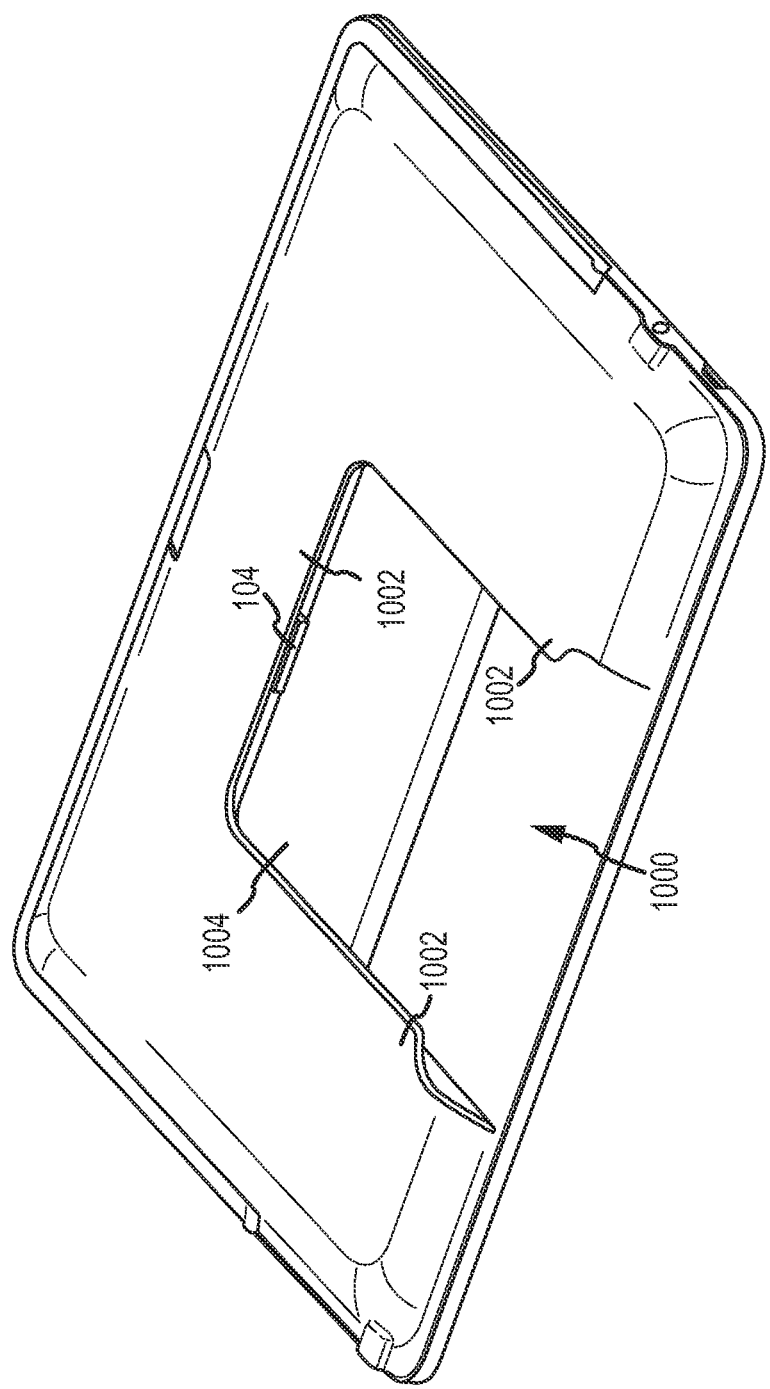
FIG. 12 illustrates another embodiment of a tablet device including a slot for receiving a handheld device.

FIG. 12 depicts another embodiment of a tablet 100 that may retainably engage a handheld device 150. The embodiment depicted in FIG. 12 may have a slot 1000 for receiving a handheld device 150. With additional reference to FIG. 13, which shows an end-on view of the slot 1000, the slot 1000 may include a lip 1002 that overhangs at least a portion of the slot 1000. The lip 1002 may assist in retaining the handheld device 150 in the docked position. The embodiment shown in FIG. 10 may be used in conjunction with either the mechanical interlocking or frictional engagement embodiments of the retention mechanism 102 described above, or with any other appropriate retention mechanism.

Figure 13:
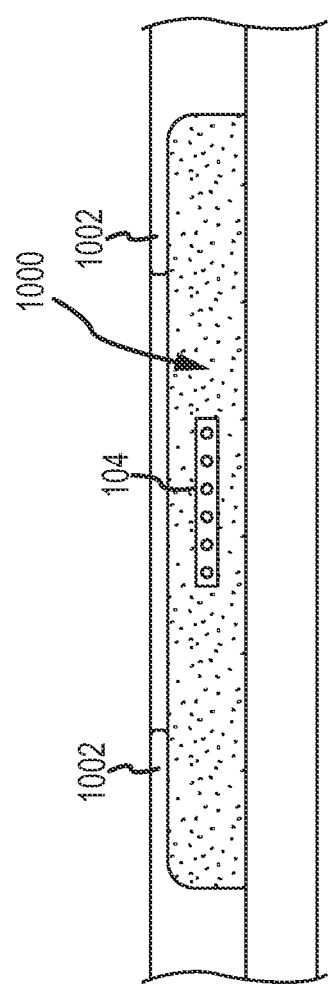
FIG. 13 illustrates an end view of the embodiment shown in FIG. 10.

It will be appreciated from FIGS. 12 and 13, a handheld device 150 disposed in the slot 1000 may have a portion thereof exposed to the exterior of the tablet 100 when the handheld device 150 is in the docked position. For example, the display 158 of the handheld device 150 may be exposed when the handheld device 150 is in the docked position. Alternatively, the exposed portion of the handheld device 150 may allow for heat to be dissipated from the handheld device 150.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A slave device for supportively engaging a master device, the slave device comprising:
    one or more hardware components integrally provided with the slave device;

an envelope formed in the slave device, when in the docked position at least a portion of the master device is contained within the envelope of the slave device, wherein the envelope includes an aperture in a back panel of the slave device;

a retention mechanism operable to retain a master device in a docked position with respect to the slave device, wherein the retention mechanism comprises:

a connector disposed in the envelope, the connector being operable to establish a communication interface between the master device and the one or more hardware components for communication between the master device and the one or more hardware components when the master device is in the docked position;

a sled movably disposed in the envelope and configured to receive the master device through a sliding motion aligned with the aperture and hold the master device within the envelope, the sled conforming to a contour defined by an edge and at least partially by two adjoining edges of the slave device, wherein the sled is movably disposed within the envelope of the slave device, wherein the sled comprises:

two or more sidewalls to hold the master device;

a tab that extends from one of the sidewalls and holds a latch detachably connected to the slave device to retain and release the master device from the envelope; and wherein the master device is operable to control the one or more hardware components of the slave device when the master device is in the docked position, wherein the one or more hardware components require communication with the master device to realize full functionality.

2. The slave device according to claim 1, wherein the slave device comprises a tablet device, and wherein the master device comprises a handheld device.

3. The slave device according to claim 1, wherein the retention mechanism includes frictional engagement of the master device by the slave device configured to prevent release of the master device.

4. The slave device according to claim 1, wherein at least one input device of the master device is exposed at an exterior of the slave device when the master device is in the docked position.

5. The slave device according to claim 1, wherein the one or more hardware components includes a touch screen display disposed on a first side of the slave device, wherein, when the master device is in the docked position, display data provided to, and input data received from, the touch screen display is exchangeable between the slave device and the master device.

6. The slave device according to claim 1, wherein the slave device does not include a wireless modem.

7. The slave device according to claim 1, wherein the slave device does not include a processor operable to exploit full functionality of the one or more hardware components.

8. The slave device according to claim 1, wherein the communication interface includes a power interface for providing power between the master device and slave device.

9. A system for docking portable electronic devices, the system comprising:

a master device including a processor, the master device having a communication port in operative communication with the processor; and a slave device including:

an envelope formed in the slave device, when in the docked position at least a portion of the master device is contained within the envelope of the slave device, wherein the envelope includes an aperture in a back panel of the slave device;

one or more hardware components integrally provided with the slave device;

a retention mechanism operable to retain the master device in a docked position with respect to the slave device, wherein when in the docked position at least a portion of the master device is contained within the envelope of the slave device, wherein the retention mechanism comprises:

a connector in operative communication with the one or more hardware components of the slave device;

a sled movably disposed in the envelope and configured to receive the master device through a sliding motion aligned with the aperture of the master device and hold the master device within the envelope, the sled conforming to a contour defined by an edge and at least partially by two adjoining edges of the slave device, wherein the sled is movably disposed within the envelope of the slave device, wherein the sled comprises:

two or more sidewalls to hold the master device;

a tab that extends from one of the sidewalls and holds a latch detachably connected to the slave device to retain and release the master device from the envelope; and wherein the connector is operable to establish a communication interface with the communication port of the master device for communication between the processor and the one or more hardware components when the master device is in the docked position, wherein the processor is operable to control the one or more hardware components when the master device is in the docked position, wherein the one or more hardware components require communication with the processor to realize full functionality, wherein the slave device comprises a tablet device, wherein the master device comprises a handheld device, wherein the retention mechanism is operable to selectively release the master device from the docked position, wherein the retention mechanism includes at least one engagement member that is interlockingly engageable with a correspondingly shaped engagement feature of the master device when the master device is in the docked position to securably retain the master device in the docked position, wherein the at least one engagement member is displaceable from interlocking engagement with the engagement feature for selectively releasing the master device, and wherein the engagement feature of the master device comprises a contour defined at least partially by the housing of the master device.

10. The system according to claim 9, wherein the retention mechanism includes frictional engagement of the master device by the slave device configured to prevent release of the master device.

11. The system according to claim 9, wherein at least one input device of the master device is exposed at an exterior of the slave device when the master device is in the docked position.

12. The system according to claim 9, wherein the one or more hardware components includes a touch screen display disposed on a first side of the slave device, wherein, when the master device is in the docked position, display data provided to, and input data received from, the touch screen display is exchangeable between the slave device and the master device.

13. The system according to claim 9, wherein the slave device does not include a wireless modem.

14. The system according to claim 9, wherein the slave device does not include a processor operable to exploit full functionality of the one or more hardware components.

15. The system according to claim 9, wherein the communication interface includes a power interface for providing power between the master device and slave device.

16. A method for docking portable electronic devices, the method comprising:
positioning a master device in a docked position with respect to a slave device;
sliding the master device in alignment with an aperture in a back panel of the slave device;
engaging a sled configured to hold the master device within an envelope that includes the aperture, the sled conforming to a contour defined by an edge and at least partially by two adjoining edges of the slave device, wherein the sled is movably disposed within the envelope of the slave device, wherein the sled comprises two or more sidewalls to hold the master device and a tab that extends from one of the sidewalls and holds a latch detachably connected to the slave device to retain and release the master device from the envelope;
retaining, using the sled, the master device with respect to the slave device;
connecting, upon the positioning, a communication port of the master device with a connector of the slave device disposed with respect to the sled;
communicating data between the slave device and the master device; and
controlling, with the master device, one or more hardware components of the slave device, wherein the sled is operable to selectively release the master device from the docked position, wherein the sled includes at least one engagement member that is interlockingly engageable with a correspondingly shaped engagement feature of the master device when the master device is in the docked position to securably retain the master device in the docked position, wherein the at least one engagement member is displaceable from interlocking engagement with the engagement feature for selectively releasing the master device, and wherein the engagement feature of the master device comprises a contour defined at least partially by the housing of the master device.

17. The method according to claim 16, wherein the connecting occurs during operation of the master device.

18. The method according to claim 17, wherein the communicating and controlling occurs without disruption of operation of the master device.

19. The method according to claim 16, wherein the slave device comprises a tablet and the master device comprises a handheld device.

20. The method according to claim 16, wherein the method further includes providing power via the connector and communications port between the master device and the slave device.

* * * * *